Dec. 13, 1966

B. B. OSHER 3,291,669

METHOD OF FORMING AN INFORMATION RETRIEVAL APERTURE CARD

Filed Dec. 10, 1963

2 Sheets-Sheet 1

INVENTOR.
BENJAMIN B. OSHER
BY
Sherman Levy
ATTORNEY

INVENTOR.
BENJAMIN B. OSHER

United States Patent Office 3,291,669

Patented Dec. 13, 1966

3,291,669

METHOD OF FORMING AN INFORMATION RETRIEVAL APERTURE CARD

Benjamin B. Osher, Lawrence, N.Y., assignor to Kleer-Vu Industries, Inc., New York, N.Y.

Filed Dec. 10, 1963, Ser. No. 329,449
2 Claims. (Cl. 156—73)

The present invention relates to information retrieval window aperture cards and method and means for forming the same, and it particularly relates to the preparation of aperture cards in use for such systems using microfilm, and the present invention is a continuation-in-part of patent application Serial No. 199,757.

In aperture card retrieval systems, there are provided compact thin paper cards which have attachments thereto consisting of transparent film which may carry photographic information.

This film may be associated with the card at a window or along the edge thereof.

It has been found most important that the microfilm or plastic film or sheet be substantially integral and attached to the card and not be readily separable therefrom.

It is among the primary objects of the present invention to provide a window card construction in which the microfilm or picture is substantially integrally connected to the card in such a way that the film and the card are an integral sheet and so that the edges of the film are substantially united in an integral fashion with the edges of the card.

Another object of the present invention is to provide an information retrieval card having a transparent microfilm window in which the edges of the paper in the window are substantially integrally joined with no likelihood of separation thereof and without the necessity of using pressure sensitive adhesives, frames or plaques which permit ready detachment and which also involve considerable expense for assembly.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In information retrieval systems using microfilm, it is desirable to assemble the microfilm with the card and particularly with the window opening in the card in a permanent fashion and also to be able to stack the cards or maintain them and use them in mechanisms in which the cards containing the windows are held in stacks or moved over in contact with one another without likelihood of displacement or loss of the microfilm windows.

In the preferred form of the invention, the paper cards are of a stiff compact calendared paper, quite rigid and carry perforations so as to be able to pass through and be selected by various types of machines and information retrieval systems.

The film may be collulose acetate or Mylar (polyethylene terephthalate).

Less preferably, plastic such as Cronar, polyethylene, polypropylene and nylon may be employed.

Desirably, the thickness of the film should always be less than the thickness of the card ranging from 0.003" to 0.007" with the card being normally about 0.007" to 0.009" in thickness.

It has been found that in forming the junction between the film and the card, it is desirable that there be an overlapping of 0.02 to 0.05" or even ranging from 0.005 to 0.100", and it has been found that the preferred film is Mylar or cellulose acetate.

In forming the integral unit, it has been found that it is desirable to utilize a vibration tool vibrating at an ultrasonic rate with the vibratory tool applied to the paper and with the film held against the anvil.

The preferred rate of vibration for joining paper to the plastic is about 20,000 cycles with a range of 18,000 to 35,000 cycles.

In the operation, the paper is first hammered by the tool until its fibers are compressed about ¼ to ⅓ of the normal thickness which takes about ⅓ to ½ of the total time of contact with the minor proportion of the contact and action of the tool causing a junction of the plastic with the fibers of the compressed paper.

For example, it has been found that with a two second hammering of the overlapping paper on top with the plastic edge below, the paper will first be compressed by at least 50% of its thickness and desirably from 10 to 25% of its thickness and then it will be hammered into the film so that the film will flow integrally in and around the fibers of the compressed paper.

It is an important feature of the present invention that the paper acts as a middle agent of the ultrasonic vibration so that the edges of the paper are hammered into a substantially integral union with the edges of the film.

In the final integration, the overlapping portions of the film and the paper will be substantially integrally united with the plastic material forming a shell or enclosure around the fiber of the overlapping paper portion and with the fibers extending through and into the overlapped edge portion of the film and with the emulsion being integrated with both the paper fibers and paper base. It is possible to join the edges of a card to a projecting sheet of film.

It has been found most satisfactory according to the preferred body of the present invention to join the edges of the film to the edges of a window opening.

Desirably the tool has a rounded edge portion which may be ¼" radius and have an axis which is transverse to the direction of the movement of the card in respect to the vibratory head which applies a hammering pressure to form the junction.

With a window, an elongated tool may be employed of about 2½" in length and about ½" in width with a contact radius of about ½" which may be passed at an angle across the edges of the window where the overlap occurs, the angle being 30 to 45° with the seal being achieved in about two seconds.

With an overlap along the edges of the card with a film projecting away from said edge, the speed may range from ten to twenty feet per minute with the curved edge of the tool being transverse to the direction of movement and transverse to the overlap and with the overlap moving under the tool which is held fixed in position.

The preferred tool vibratory rate is about 20,000 cycles per second with the production of a substantially integral joint between the solid anvil and the continuously hammering tool and without any change in the properties of the material from the viewpoint of deterioration of molecular structure.

The tool will force the plastic into the junction regardless of intervening size of the card or emulsion coating on the film and any heat that is produced will be retained internally within the junction without requiring external cooling or the use of insulation.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Referring to FIGS. 1 to 5, the basic fibrous or paper material A has a window opening B to the periphery of which is placed the plastic sheet material C which may be of cellulose acetate or polyethylene terephthalate.

Around the marginal portion 10 which overlaps the periphery 12 is applied the ultrasonic tool causing a sealing and amalgamation of the periphery of the plastic material at 14 into the fibers at the edge of the window as indicated at 16.

A compact thin paper board A is desirably of 0.007" in thickness, and it is stiff and rigid and may carry suitable classification or other types of perforations for use in information retrieval systems.

The film C will carry suitable photographs or other material which can be secured from a stack either by card or hand.

The preferred film indicated at C is cellulose acetate or polyethylene terephthalate known as Mylar or Cronar, and less preferably polyethylene or polypropylene, the latter being known as Olefane.

Figure 1:
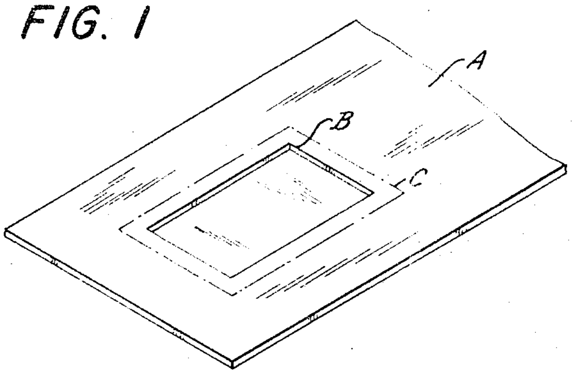
FIG. 1 is a top perspective view showing the back of a transparent plastic film positioned under and overlapping the periphery of a window opening in an index card as inserted or placed under hammering tool.
Figure 4:
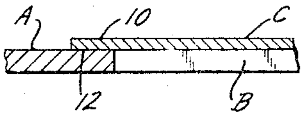
FIG. 4 is a transverse fragmentary sectional view of the inverted card upon the line 4—4 of FIG. 2.
Figure 2:
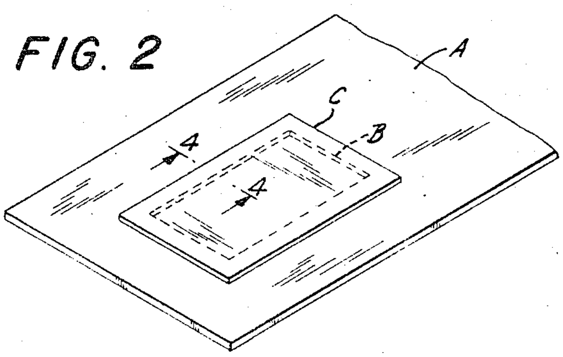
FIG. 2 is a reverse inverted perspective view as compared to FIG. 1 showing the film overlapping the edges of the opening of the window.
Figure 5:
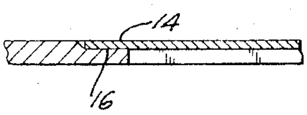
FIG. 5 is a fragmentary transverse sectional view of the inverted card upon the line 5—5 of FIG. 3.
Figure 3:
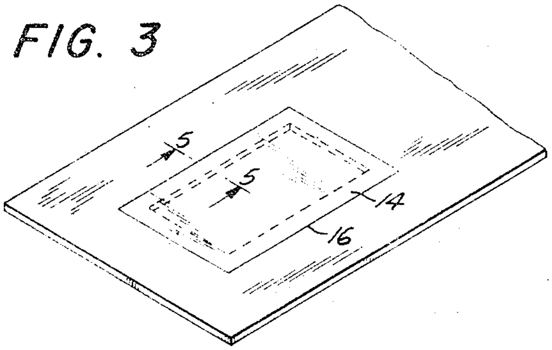
FIG. 3 is a top perspective view similar to FIG. 2 showing the window opening in the inverted card covered by the integrated plastic material.
Figure 6:
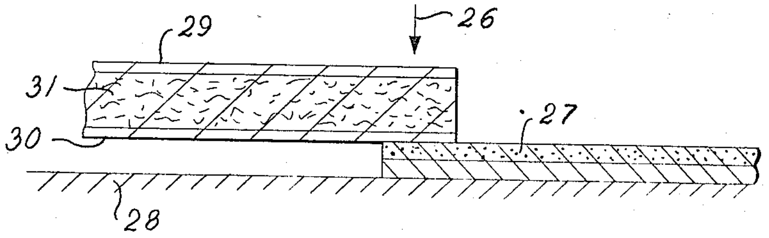
FIGS. 6, 7 and 8 are side diagrammatic sectional views respectively, showing the paper before being compressed, then during compression, and then being converted into a compressed integrated structure.
Figure 7:
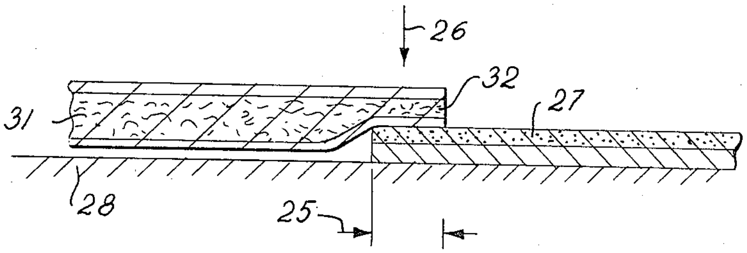
Figure 8:
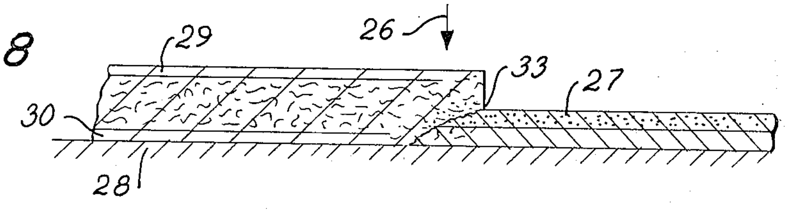

In FIGS. 6, 7 and 8 diagrammatically is shown the junction.

The overlap will vary between 0.005 to 0.10" with a desired overlap of 0.030" indicated by the dimension 25.

The thickness of the film may be 0.003 to 0.007" with the paper being on top during the integration operation and with the emulsion constituting a minor proportion of the thickness and desirably less than 1/10 to 1/2 of the thickness.

As shown in FIGS. 6, 7 and 8, the emulsion 27 is usually positioned against the paper section with the tool indicated by the arrow 26 being applied to the paper.

The anvil 28 will normally be under the paper and under the film.

Referring specifically to a typical paper structure, there are shown upper and lower coatings or sizing facings 29 and 30 with intermediate fibrous construction 31.

Firstly as indicated in FIG. 7, the paper is compressed at 32 to about one-third of its thickness which will take the first one-third to one-half of the sealing period of from two to four seconds.

Then the integration will take place as indicated at 33 during the remaining portion of the period with the emulsion and film overlapping portions being thoroughly integrated with the fibrous paper and with the film edge being exposed and the lower coating 30 of the paper being integrated into the junction.

Here the overlap at 25 will be subjected to the action of the lower cylinder edge portion 34 which is extended at an angle obliquely to the edges of the window opening such angle being at 35 to 40° as indicated at 35.

In this case, the total is long enough as indicated by the dimension 36 which may be 2½" to extend entirely across the window opening from side to side thereof with an oblique seal being formed in about two seconds.

The intermediate portion of the tool between the overlaps will not contact the film so that all of the pressure will be applied at the overlaps on each side of the window giving a limited contact area.

The paper beyond the overlap will not be effected since there is a space between it and the anvil.

Figures 9, 10:
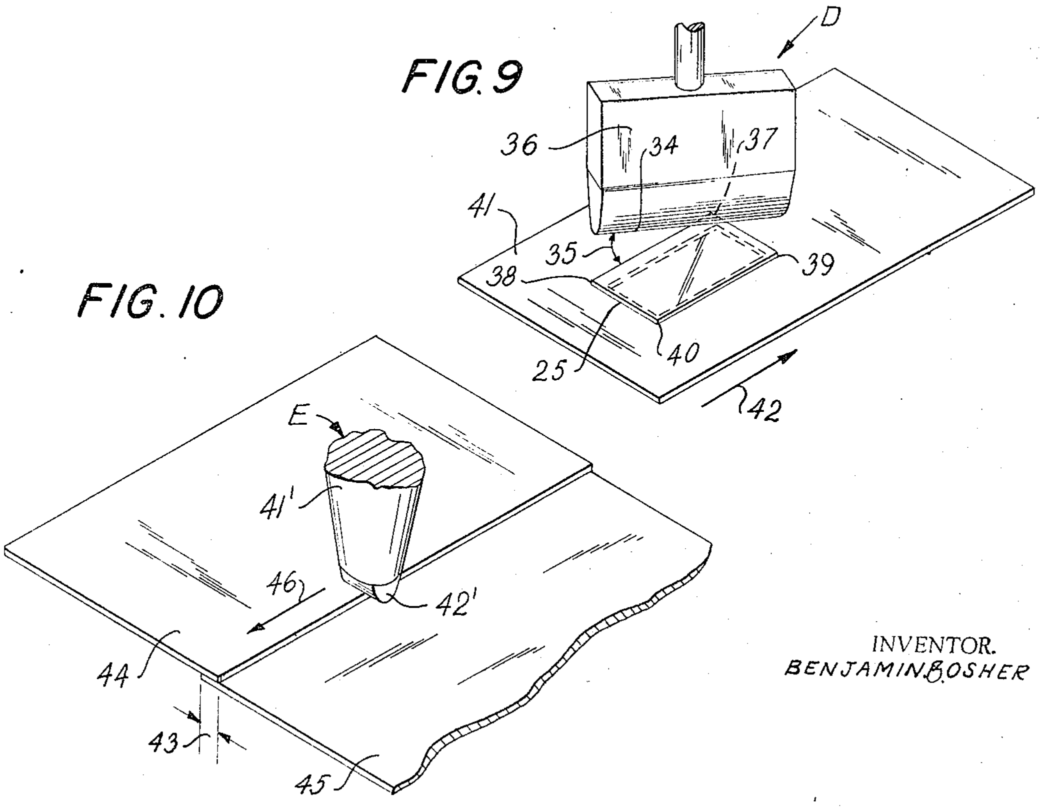
FIG. 9 is a side perspective view illustrating the manner in which the tool as applied to a sealing of a window covering in a window opening in a card.
FIG. 10 is a perspective view similar to FIG. 9 showing the sealing of an edge of a card to a film extending from one edge thereof.

This tool as shown in FIG. 9 and D will be driven preferably at a rate of about 20,000 cycles by a suitable transducer of the magnetostrictive type which has a high efficiency due to the expansion and contraction of a nickel rod when subjected to a high frequency oscillatory magnetic field.

The tool will initially start sealing at the point 37 and then will pass obliquely over the edges of the window past the points 38 and 39 and will complete its sealing when it passes beyond the point 40.

The card 41 may be moved by the anvil indicated by the arrow 42 to give an exposure time of about two seconds.

The tool E may also be driven as a tool D, and it has a depending conical portion 41 terminating in a rounded semi-cylindrical contact portion 42.

The overlap 43 may also be of the same order as the overlap on FIG. 9 of about .03" and varying from .005" to .010", and the card 44 with the projecting film 45 may be moved by the anvil in the direction indicated by the arrow 46 at a rate of about ten to twenty feet per minute.

The applicant's sealing system will give an integral combination between the card and the film which will prevent separation thereof when the cards are slid over one another or frequently contacted with various elements in sorting or even during manual handling in stacking, filing and examination.

It is not necessary to use separate frames carrying pressure sensitive adhesives nor is it necessary to apply adhesive to either the edges of the film or to where the film is to be attached.

The film will not project beyond the face of the card causing stoppage or jamming of cards sliding one over the other nor is there any likelihood that the adhesive will become weakened or oxidized or permit the film and the paper card to separate from one another.

Any tendency toward warping will be eliminated, and it will not be necessary that special film or cards be used with the paper compressed in or about the place where the attachment of the transparent film takes place.

The cards of the present application will be readily processed in standard business machines without jamming whether such machines be perforation or punching machines, verifying machines or the like.

The stack of cards will be of uniform height and depth, and there will not be any unevenness or tendency to cant or form uneven piles.

As many changes could be made in the above information retrieval window aperture cards and method and means for forming the same, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A method of sealing a transparent film to a window opening in an information retrieval card which comprises placing the card upward and the film underneath with an overlap of about .030" around the periphery thereof, placing the overlapped assembly against an anvil and applying a vibratory ultrasonic tool to the overlap and then applying a pressure of about 2,000 to 20,000 pounds per square inch at a cyclic rate of about 18,000 to 25,000 cycles for a period of about 1½ to 2 seconds to cause a mechanical bond and an integration of the overlapping edges of the card and the film and whereby the card and film will be coplanar, the tool consisting of an elongated member obliquely extending across the window opening.

2. A method of sealing a transparent film to a window opening in an information retrieval card which comprises placing the card upward and the film underneath with an overlap of about .030″ around the periphery thereof, placing the overlapped assembly against an anvil and applying a vibratory ultrasonic tool to the overlap and then applying a pressure of about 2,000 to 20,000 pounds per square inch at a cyclic rate of about 18,000 to 25,000 cycles for a period of about 1½ to 2 seconds to cause a mechanical bond and an integration of the overlapping edges of the card and the film and whereby the card and film will be coplanar, the tool being applied and passing over the window opening from one corner of the film to an opposite corner of the film at an angle of about 35 to 45° to the overlapped edges of the film.

References Cited by the Examiner

UNITED STATES PATENTS 2,633,655 4/1953 Langan ____________ 156—108

FOREIGN PATENTS 650,521 10/1962 Canada.

OTHER REFERENCES

Alles, Society of Motion Picture and Television Engineers, December 1961, vol. 71, pp. 976–978.

EARL M. BERGERT, *Primary Examiner.*

DOUGLAS J. DRUMMOND, *Examiner.*